United States Patent
Gabriel

(10) Patent No.: US 10,530,035 B2
(45) Date of Patent: Jan. 7, 2020

(54) METHOD AND SYSTEM FOR THE AUTOMATED ALIGNMENT OF ANTENNAS

(71) Applicant: KATHREIN-Werke KG, Rosenheim (DE)

(72) Inventor: Roland Gabriel, Rosenheim (DE)

(73) Assignee: KATHREIN SE, Rosenheim (DE)

(*) Notice: Subject to any disclaimer, the term of this patent is extended or adjusted under 35 U.S.C. 154(b) by 180 days.

(21) Appl. No.: 15/539,933

(22) PCT Filed: Jan. 20, 2016

(86) PCT No.: PCT/EP2016/051152
§ 371 (c)(1),
(2) Date: Jun. 26, 2017

(87) PCT Pub. No.: WO2016/116516
PCT Pub. Date: Jul. 28, 2016

(65) Prior Publication Data
US 2017/0373371 A1    Dec. 28, 2017

(30) Foreign Application Priority Data
Jan. 20, 2015 (GB) .................................. 1500936.8

(51) Int. Cl.
*H01Q 3/08* (2006.01)
*H01Q 1/12* (2006.01)
(Continued)

(52) U.S. Cl.
CPC ............. *H01Q 1/1257* (2013.01); *H01Q 3/08* (2013.01); *H01Q 19/18* (2013.01); *H04B 17/0087* (2013.01); *H01Q 3/34* (2013.01)

(58) Field of Classification Search
CPC ........ H01Q 1/1257; H01Q 19/18; H01Q 3/08; H01Q 3/34; H04B 17/101; H04B 17/0087; H04B 17/11; H04B 17/12; H04B 17/102
See application file for complete search history.

(56) References Cited

U.S. PATENT DOCUMENTS 4,305,075 A    12/1981  Salvat et al.
6,836,675 B2   12/2004  Zhang
(Continued)

FOREIGN PATENT DOCUMENTS

EP    180157     8/1991
EP    2204878    9/2013
(Continued)

OTHER PUBLICATIONS

International Search Report issued in PCT/EP16/51152 dated Apr. 5, 2016.
GB Search Report issued in 1500936.8 dated Jun. 12, 2015.

*Primary Examiner* — Hoang V Nguyen
*Assistant Examiner* — Awat M Salih
(74) *Attorney, Agent, or Firm* — Niels Haun; Dann, Dorfman, Herrell & Skillman

(57) ABSTRACT

An antenna comprising a reflector (20) connected to a motor drive (30), a primary radiator (30) for transceiving a radio beam at an operating frequency impinged on the reflector (20) is disclosed. A coarse alignment system comprising a motor drive is connected to the reflector (20) for driving at least one of the rotation and the tilting of the reflector. The coarse alignment system (70; 270; 370; 470) comprising an auxiliary antenna (50) connected to the control device (60) for communicating with a further auxiliary antenna (10*b*), at a second frequency different from the operating frequency. A fine alignment system is also present for electronic (Continued)

adjustment of the radio beam. A control device controls the coarse alignment system and the fine alignment system.

15 Claims, 3 Drawing Sheets

(51) Int. Cl.
*H04B 17/00* (2015.01)
*H01Q 19/18* (2006.01)
*H01Q 3/34* (2006.01)

(56) References Cited

U.S. PATENT DOCUMENTS

| | | |
|---|---|---|
| 8,451,171 B1 | 5/2013 | Santoru |
| 2003/0080898 A1 | 5/2003 | Wang et al. |
| 2004/0229652 A1 | 11/2004 | Goldberg et al. |
| 2006/0077097 A1 | 4/2006 | Dybdal et al. |
| 2009/0135074 A1 | 5/2009 | Yang et al. |
| 2010/0302101 A1 | 12/2010 | Leiba et al. |
| 2013/0002505 A1* | 1/2013 | Teillet .................... H01Q 1/246 343/835 |
| 2013/0321204 A1 | 12/2013 | Zahavi et al. |
| 2014/0333500 A1 | 11/2014 | Moon et al. |
| 2015/0138026 A1* | 5/2015 | Shay ...................... H04B 17/12 343/703 |

FOREIGN PATENT DOCUMENTS

| | | |
|---|---|---|
| WO | 2013/058673 | 4/2013 |
| WO | 2014/161566 | 10/2014 |

\* cited by examiner

METHOD AND SYSTEM FOR THE AUTOMATED ALIGNMENT OF ANTENNAS

FIELD OF THE INVENTION

The invention relates to an antenna system with two antennas being adapted to automatically align with each other and a method for automated alignment of the at least two antennas.

BACKGROUND TO THE INVENTION

Microwave radio relay is a technology for the transmission of digital signals and analog signals, such as telephone calls, television programs, and computer data between two locations using microwave links on a line of sight radio path. The microwaves are transmitted between the two locations along the microwave links using directional antennas. The requirement of a line of sight for the microwave link limits the distance between the two locations up to maximum of about 50 kilometers.

Microwaves along the microwave link between the two locations have extremely narrow beams. This narrow beam has the advantage that the narrow beam is confined to a line of sight path from the one location to the other location and the microwaves do not therefore interfere with other microwave equipment. The narrow beams are also an advantage for the transmission of maximum power. Similarly, other ones of the microwave links nearby can use the same frequencies, as the microwave links will not interfere with each other. The antennas used in such microwave link systems must be therefore highly directional. The highly directional beam of the microwave link may reduce the risk of interference, but it does complicate the alignment of the radio beams in the microwave link between the two antennas. The direction is highly sensitive to the positioning of the antenna and, in particular, to the positioning of any reflectors in the antenna.

The issue of aligning microwave antennas is known, for example from U.S. Pat. No. 6,836,675 (Zhang), which teaches a method for aligning antennas during the installation of microwave communications systems. A computerized link quality mechanism monitors the link quality of the link during the aligning of the installation. The link quality comprises the performance of the data communications status, such as the signal strength and the noise test results.

SUMMARY OF THE INVENTION

An antenna system to enable the automatic alignment of two antennas in a microwave relay is disclosed. The antenna system comprises a reflector connected to a motor drive, a primary radiator for transceiving a radio beam at an operating frequency impinged on the reflector; a coarse alignment system comprising a motor drive connected to the reflector for at least one of rotation and tilting of the reflector, a fine alignment system for electronic adjustment of the radio beam; and a control device for controlling the coarse alignment system and the fine alignment system.

The motor drive is required for the initial coarse alignment of the dish or parabolic antenna. Once the radio beam is directed along the microwave link to the other dish or parabolic antenna, the motor drive can be switched off and, if required, disabled. Any finer and further adjustments to the radio beam are carried out in the primary radiator of the dish or parabolic antenna. The motor drive is generally not required any longer, once the broad alignment has been carried out. The motor drive can be left to rust and it generally requires no maintenance.

The control device is used in order to drive the motor drive for the rotation and/or tilting of the reflector of the dish or parabolic antenna or for the rotation and/or tilting of the whole dish or parabolic antenna and later make the fine adjustments. The control device can, if required, communicate with the motor drive of the other dish or parabolic antenna of the antenna system.

The coarse alignment system comprises an auxiliary antenna connected to the control device for communicating with a further auxiliary antenna, at a second frequency different from the operating frequency.

In a further aspect of the disclosure, the control device is adapted to detect side lobes of the operating frequency for controlling the coarse alignment system.

In another aspect of the disclosure, the primary radiator comprises a first transceiver, and the fine alignment system comprises an auxiliary transceiver and a commuting system for commuting between the first transceiver and the auxiliary transceiver.

The present disclosure also teaches an antenna system comprising at least two antennas as described above, and the control devices of the at least two antennas are adapted to exchange control messages concerning alignment of the at least two antennas.

The present disclosure further teaches a method for aligning a first antenna and a second antenna, the first antenna having a first primary radiator and a first primary reflector, the second antenna having a second primary radiator and a second primary reflector, the method comprising: causing at least one of the first and second reflectors to rotate and/or tilt using a motor drive and thus establishing a communications link with a second one of the two antenna; adjusting the communications link by electronically changing parameters of the radio beam along the communications link.

The method comprises establishing an auxiliary communication link between a first auxiliary antenna and a second auxiliary antenna of the two antennas.

In yet another aspect of the disclosure, the method comprises using side lobes of an operating beam between a first primary radiator and a second primary radiator of the two antennas.

In a further aspect of the disclosure, the method comprises sending a control message from the first one of the two antenna systems to the second one of the two antenna systems during rotation of the reflector indicative of a strength of the communications link.

In an aspect of the invention, the method may comprise disabling the motor drive after establishment of the communications link.

In another aspect of the invention, the method further comprises using a first transceiver and a second transceiver when the communication link is established, for adjusting the communication link, and commuting between the first transceiver and the auxiliary transceiver.

These and other aspects of the invention will be apparent from and elucidated reference to the embodiment(s) described hereinafter.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their references. It will be understood that features of one aspect or embodiment of the invention can be combined with a feature of a different aspect or aspects and/or embodiments of the invention.

Figure 1:
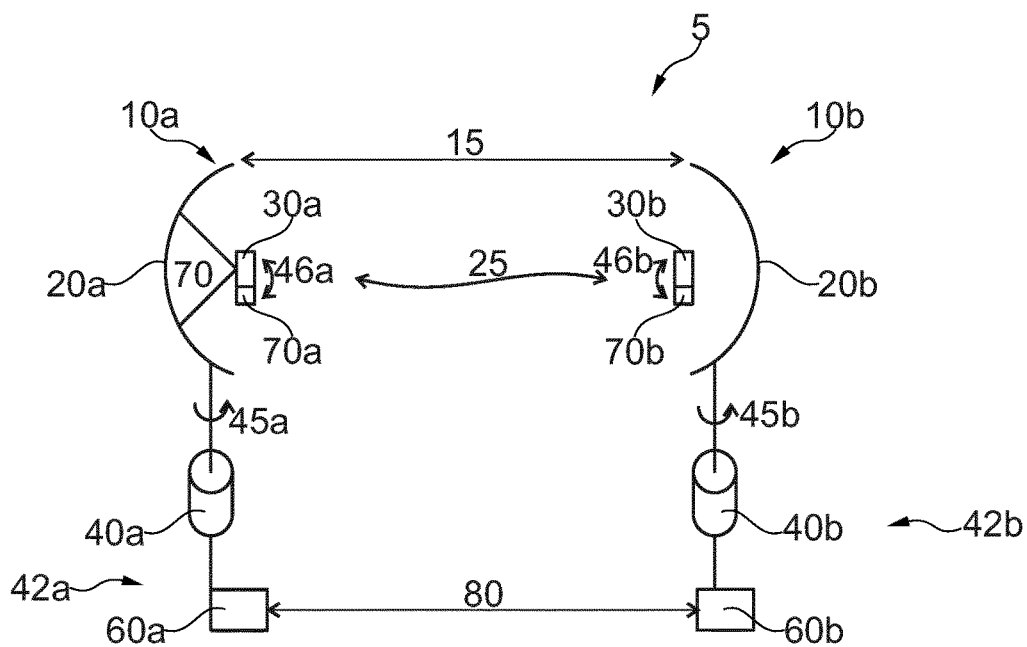
FIG. 1 shows an antenna system with two dish or parabolic antennas to be automatically aligned using a fixed communication link between the dish or parabolic antennas, according to one aspect of the disclosure.

FIG. 1 shows an example of an antenna system 5 of this disclosure. The antenna system 5 comprises a first parabolic antenna 10a and a second parabolic antenna 10b that have to be aligned with each other. The distance 15 between the two parabolic antennas 10a and 10b can be between 0.01 or less km and 50 kilometers, but this is not limiting of the invention. Throughout the disclosure, elements which are identical are designated with the same reference number. The letter "a" and "b" are mainly used to distinguish between elements described with reference to a first parabolic antenna (left on the figure) and a letter "b" for the elements described with reference to a second parabolic antenna (right on the figures).

The antenna system 5 is configured to transmit signals along a communications link 25 (also termed microwave link). In one aspect of the disclosure, the antenna system is configured to transmit radio waves in the microwave band at around 60 GHz. This microwave band is suitable for the transmission of telephone calls, data and television transmissions, but this again is not limiting the invention.

The first parabolic antenna 10a has a first reflector 20a and a first primary radiator 30a. The second parabolic antenna 10b has a second reflector 20b and a second primary radiator 30b. The primary radiators 30a, 30b are adapted to receive radio signals on the communications link 25 between the first parabolic antenna 10a and the second parabolic antenna 10b and/or to transmit radio signals over the communications link 25.

It is known that this transmission is carried out by transmitting a signal from the first primary radiator 30a as a signal 70, which is then reflected in the direction of the second parabolic antenna 10b by the first reflector 20a. Similarly, a signal is received along the communications link 25 by the first reflector 20a and focused onto the first antenna array 30a, where the signal is processed. Similarly the second primary radiator 30ba transmits a signal is then reflected in the direction of the first parabolic antenna 10a by the second reflector 20b. A signal is received along the communications link 25 by the second reflector 20b and focused onto the second primary radiator 30b, where the signal is processed.

Figure 3:
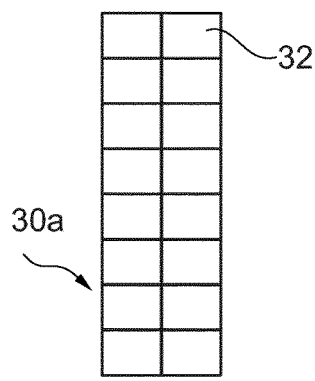
FIG. 3 shows a preferred embodiment of a primary radiator which can be used with an antenna system according to FIG. 1 or FIG. 2.

The primary radiator may be an antenna array having a plurality of antenna elements, as shown on FIG. 3. The primary radiator 30a comprises at least one array of radiation elements 32. In the example of FIG. 3, the array comprises eight radiation elements 32, but this is not limiting the invention. Preferably, the radiation elements 32a, 32b, are individually and independently controllable and addressable. This means that the phase and amplitude of the radiation elements 32 are either individually addressable, or addressable in subsets of radiation elements 32.

The array of the primary radiator can be made up of several dielectric antennas, patch antennas, printed dipoles or horn antennas. For the avoidance of doubt, the use of the radiator type is not limiting this invention. Furthermore, the primary radiator may otherwise be a single horn antenna or another single radiator.

The communications link 25 is highly directional. That means the radiation characteristic of the first and second parabolic antennas comprises a narrow beam in the main radiation direction. Therefore, these narrow beams of the parabolic antennas have to be aligned by substantially aligning the first reflector 20a or the whole first parabolic antenna 10a with the second reflector 20b or the whole second parabolic antenna 10b of the antenna system. This alignment is carried out in a two-stage process, as will be described with respect to FIG. 4.

A first coarse adjustment system 42a and a second coarse adjustment system 42b are provided to align mechanically the first and second parabolic antennas 10a, 10b. The first coarse adjustment system 42a comprises a first motor drive 40a which is connected to the first reflector 20a or the first parabolic antenna 10a. The second coarse adjustment system 42b comprises a second motor drive 40b which is connected to the second reflector 20b or the second parabolic antenna 10b.

The first and/or second motor drive 40a, 40b are used for broadly aligning the first reflector 20a or the whole first parabolic antenna 10b with the second reflector 20b or the whole second parabolic antenna 10b.

The first motor drive 40a is adapted to rotate the first reflector 20a or the whole first parabolic antenna 10a around a main axis Xa, in a plane substantially perpendicular to the direction of the communications link 25, as shown by rotational arrow 45. The first motor drive 40a is further adapted to tilt the first reflector 20a or the entire first parabolic antenna 10a in a plane comprising the direction of the communication links, as shown by rotational arrow 46a. Similarly, the second motor drive 40b is adapted to rotate the second reflector 20b or the whole second parabolic antenna 10b around a main axis Xb, in a plane substantially perpendicular to the direction of the communications link 25, as shown by rotational arrow 45b. The second motor drive 40b is further adapted to tilt the second reflector 20b or the entire second parabolic antenna 10b in a plane comprising the direction of the communication links, as shown by rotational arrow 46b.

The first motor drive 40a is connected to a first control system 60a, and the second motor drive 40b is connected to a second control system 60b. The first control system 60a, respectively second control system 60b, is adapted to control the first motor drive 40a, respectively second motor drive 40b, and hence the rotation and/or tilting of the first reflector 20a or the whole first parabolic antenna 10a, respectively the second reflector 20b or the whole second parabolic antenna 10b.

The control system 60a, 60b has a receiver to receive the control signals either from a fixed line network 80 (or a further communications network, such as using the GSM, UMTS or LTE protocol) or from the further control system 60b, 60a.

As will be explained with reference to FIG. 5, the first and/or second coarse adjustment system 42a, 42b is used for a coarse adjustment of the antenna system 5. Once the direction of the radio beam along the communications link 25 has been broadly aligned by rotation and/or tilting of the reflector 20a (and also possibly by the rotation and/or tilting of the further reflector 20b), the first and second coarse adjustment system 42a, 42b together with the motor drive 40a can be switched off or disabled. The first motor drive 40a and/or the second motor drive 40b will no longer be required and can be disconnected from a power supply. The motor drive 40a and/or the second motor drive 40b will no longer be used and can be allowed to rust if required.

The first antenna 10a comprises a first fine adjustment system 70a and the second antenna 10b comprises a second fine adjustment system 70b, to carry out fine adjustments to the direction of the radio beam. The first fine adjustment system 70a is adapted to receive control signals from the first control device 60a. The second fine adjustment system 7b is adapted to receive control signals from the second control device 60b.

The fine adjustment system is enabled to adjust the direction of the beam, in order to compensate for variations arising from e.g. vibrations of the antenna, as will be explained with reference to FIG. 4.

In particular, when the primary radiator is an array of radiation elements, the fine adjustment system is adapted to adjust the phase and amplitude of the radiation elements. When the primary radiator is a horn antenna, the fine adjustment system comprises lenses or a separate actuator at the feed.

Figure 2:
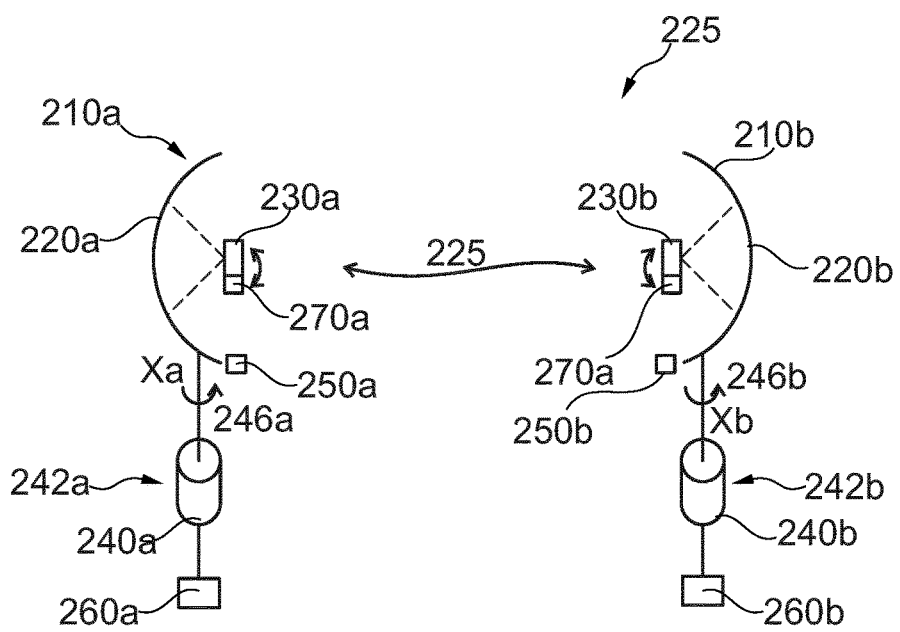
FIG. 2 shows an antenna system with two dish or parabolic antennas to be automatically aligned using auxiliary antennas, according to another aspect of the disclosure.

FIG. 2 shows an example of an antenna system 205 according to another aspect of this disclosure.

The antenna system 205 comprises a first parabolic antenna 210a and a second parabolic antenna 210b that have to be aligned with each other. The first parabolic antenna 210a has a first reflector 220a and a first primary radiator 230a. The second parabolic antenna 210b has a second reflector 220b and a second primary radiator 230b. The primary radiators 230a, 230b are adapted to receive radio signals on a communications link 225 between the first parabolic antenna 210a and the second parabolic antenna 210b and/or to transmit radio signals over the communications link 225.

A first coarse adjustment system 242a and a second coarse adjustment system 242b are provided to align mechanically the first and second parabolic antennas 210a, 210b. The first coarse adjustment system 242a comprises a first motor drive 240a which is connected to the first reflector 220a or the first parabolic antenna 210a. The second coarse adjustment system 242b comprises a second motor drive 240b which is connected to the second reflector 220b or the second parabolic antenna 210b.

The first and/or second motor drive 240a, 240b are used for broadly aligning the first reflector 220a or the whole first parabolic antenna 210b with the second reflector 220b or the whole second parabolic antenna 210b.

The first motor drive 240a is adapted to rotate the first reflector 220a or the whole first parabolic antenna 210a around a main axis Xa, in a plane substantially perpendicular to the direction of the communications link 225, as shown by rotational arrow 246a. The first motor drive 240a is further adapted to tilt the first reflector 220a or the entire first parabolic antenna 210a in a plane comprising the direction of the communication links, as shown by rotational arrow 246a. Similarly, the second motor drive 240b is adapted to rotate the second reflector 220b or the entire second parabolic antenna 210b around a main axis Xb, in a plane substantially perpendicular to the direction of the communications link 225, as shown by rotational arrow 245b. The second motor drive 240b is further adapted to tilt the second reflector 220b or the entire second parabolic antenna 210b in a plane comprising the direction of the communication links, as shown by rotational arrow 246b.

The first motor drive 240a is connected to a first control system 260a, and the second motor drive 240b is connected to a second control system 260b. The first control system 260a, or the second control system 260b, is adapted to control the first motor drive 240a, or respectively the second motor drive 240b, and hence to control the rotation and/or the tilting of the first reflector 220a or the entire first parabolic antenna 210a, or respectively the second reflector 220b or the entire second parabolic antenna 210b.

A first auxiliary antenna 250a and a second auxiliary antenna 250b are positioned at the location of the first parabolic antenna 210a and of the second parabolic antenna 210b, respectively, and are connected to the first control system 260a and the second control system 260b. The first auxiliary antenna 250a and the second auxiliary antennas 250b can establish an auxiliary radio beam or radio link in general between the location of the first parabolic antenna 210a and the second parabolic antenna 210b for a coarse adjustment of the first parabolic antenna 210a and the second parabolic antenna 210b.

The first auxiliary antenna 250a can transmit the auxiliary radio beam to the second auxiliary antenna 250b, at a much lower frequency, for example 5.6 GHz, but this is not limiting of the invention, in order to control the broad adjustment of the radio beam along the communications path 225. The 5.6 GHz beam is not highly directional and does not need any adjustment. Hence, the coarse adjustment of the antenna system may be facilitated.

Alternately, the first auxiliary antenna 250a and the second auxiliary antenna 250b may be adapted to exchange control signals using different communication standards from the communication standard used by the radio signals to be established between the main antennas 210a or 210b. Examples of different communication standards comprise, but are not limited thereto, a ZigBee protocol or a proprietary standard at 433 MHz.

The first auxiliary antenna 250a and the second auxiliary antenna 250b are therefore part of the first coarse adjustment system 242a or the second coarse adjustment system 242b. The first auxiliary antenna 250a and/or the second auxiliary antenna 250b can receive and/or send information to and from the first controller 260*a* and/or the second controller 260*b*, e.g. on a level of received power for each position of the mobile reflector.

Figure 4:
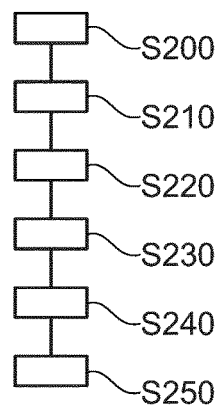
FIG. 4 shows a method for the alignment of two antennas of an antenna system according to one aspect of the disclosure.

FIG. 4 shows an example of a method of this disclosure, with reference to the antenna system 5 described in FIG. 1.

In a first step S200, the first and second parabolic antennas 10*a* and 10*b* are erected at their locations. The locations are within line of sight of each other and the first and second reflectors 20*a* and 20*b* will be mounted on the mounts connected to the first and second motor drives 40*a* and 40*b*.

The control system 60*a* and 60*b* will then start in step 210 the rotation of at least one of the first reflector 20*a* and the second reflector 20*b* in order to align the first reflector 20*a* and the second reflector 20*b* with each other.

The skilled person will understand that a first one of the two reflectors 20*a*, 20*b* may be fixed whilst the other one of the two reflectors 20*b*, 20*a* is rotated and/or tilted during alignment. Alternately, both of the reflectors 20*a*, 20*b* may be rotated and/or tilted during alignment.

The first reflector 20*a* and the second reflector 20*b* may be aligned by using an alignment beam signal which is transmitted from one antenna to the other antenna. The received power may be measured for each position of the first reflector 20*a* and/or the second reflector 20*b* (step S220). The first control system 60*a* and the second control system 60*b* can determine a position where the received power is higher, for example using an iterative process until a position of at least one of the two reflectors 20*a* or 20*b* corresponding to a maximum received power is determined.

The rotation and/or tilting of the two reflectors 20*a*, 20*b* is controlled by the two control systems 60*a*, 60*b*. The two control systems 60*a*, 60*b* may therefore exchange control or/and status messages in step S220 by the fixed link 80. Alternatively, the communication link between the two control systems 60*a*, 60*b* can be established by using the sidelobes of the reflector antennas radiation pattern. The communication of the control messages or/and the status messages does not need a link with high data rates, which are only possible using the main beam. So, if the receivers of the control systems are sensitive enough, the sidelobes of the reflector antennas radiation pattern can be used for communicating the control messages or/and the status messages.

The first reflector 20*a* and the second reflector 20*b* may be aligned by using an alignment beam signal which is transmitted from one antenna to the other antenna. The received power may be measured for each position of the first reflector 20*a* and/or the second reflector 20*b*. The first control system 60*a* and the second control systems 60*b* can determine a position where the received power is higher, for example using an iterative process until a position of at least one of the reflectors corresponding to a maximum received power is determined (step S230).

The rotation and/or tilting of the two reflectors 20*a*, 20*b* is controlled by the two control systems 60*a*, 60*b*. Once the two control systems 60*a*, 60*b* determine in step S230 that the both of the two reflectors 20*a* and 20*b* are substantially aligned with each other such that the directional radio beam on the communications link 225 is well received, the control system 260*a* and 260*b* can disable the motor drives 40*a* and 40*b* in step S240.

The motor drive 40*a*, 40*b*, will no longer be used and can be allowed to rust, if required.

Fine adjustments of the radio beam along the communications link 25 are carried out in step S250 using the antenna array 30. It is known that these adjustments can be adapted by using active components and/or software control to adjust the phase and amplitude of the signals for every antenna element of the array for forming the radio beam along the communications link 25. This fine adjustment can cope with any small movement of the parabolic antennas 10*a* and 10*b*.

Figure 5:
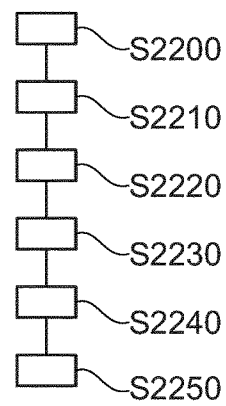
FIG. 5 shows another method for alignment of two antennas of an antenna system according to another aspect of the disclosure.

FIG. 5 shows another example of a method of this disclosure, with reference to the antenna system 205 described in FIG. 2.

In a first step S2200, the first parabolic antenna 210*a* and the second parabolic antennas 210*b* are erected at their locations. The locations are within line of sight of each other and the first reflector 220*a* and the second reflectors 220*b* will be mounted on the mounts connected to the first motor drive 240*a* and the second motor drive 240*b*.

An alignment beam will then be emitted and the control system 260*a* and 260*b* will then start, in step S2210, the rotation and possibly the tilting of at least one of the first reflector 220*a* and the second reflector 220*b* in order to align both of the two reflectors 220*a* and 220*b* with each other.

The first reflector 220*a* and the second reflector 220*b* may be aligned by using an alignment beam signal which is transmitted from one antenna to the other antenna. The received power may be measured for each position of the first reflector 220*a* and/or the second reflector 220*b* (step S2220). The first control system 260*a* and the second control systems 260*b* can determine a position where the received power is higher, for example using an iterative process until a position of at least one of the two reflectors 220*a*, 220*b* corresponding to a maximum received power is determined.

The rotation and/or the tilting of the first reflector 220*a* is controlled by the first control system 260*a* and the rotation and/or tilting of the second reflector 220*b* is controlled by the second control system 260*b*. In this aspect of the invention, a second link between the first auxiliary antenna 250*a* and the second auxiliary antenna 250*b* is used for adjusting the position of the first antenna and the second antenna of the antenna system.

The control messages may comprise information and command relating to an amount of rotation or tilting. The status message may comprise information relating to an amount of received power measured on the antenna configured in reception during the antenna alignment.

Once both of the control systems 260*a* and 260*b* determine in step S2230 that both of the reflectors 20*a* and 20*b* are substantially aligned with each other such that the directional radio beam on the communications link 225 is well received, the two control systems 260*a* and 260*b* can disable the two motor drives 240*a* and 240*b* in step S2240.

The two motor drives 240*a*, 240*b*, will no longer be used and can be allowed to rust if required.

Fine adjustments of the radio beam along the communications link 225 are carried out in step S2250 using the antenna array 230. It is known that these adjustments can be adapted by using active components and/or software control to adjust the phase and amplitude of the signals for every antenna element of the array for forming the radio beam along the communications link 225. This fine adjustment can cope with any small movement of the parabolic antennas 210*a* and 210*b*.

Figure 6:
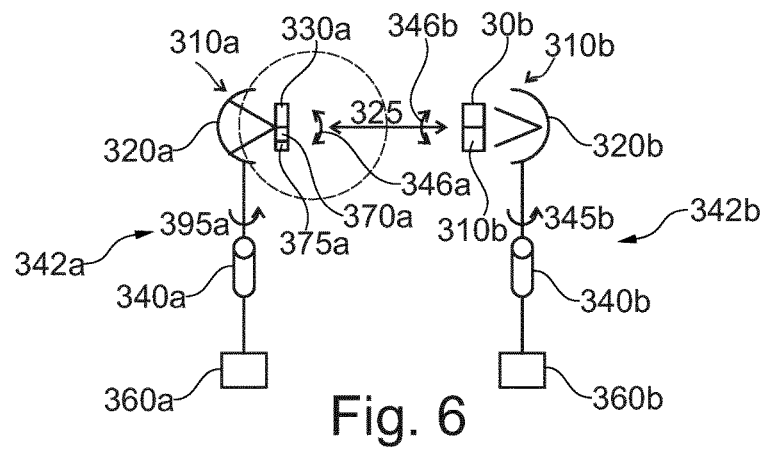
FIG. 6 shows an antenna system with two dish or parabolic antennas to be automatically aligned using auxiliary antennas, according to another aspect of the disclosure.
Figure 7:
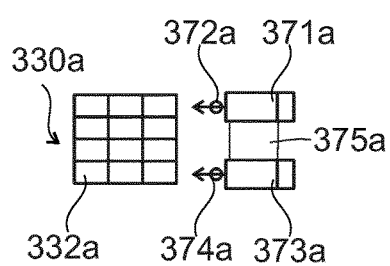
FIG. 7 shows an embodiment of a primary radiator which can be used with an antenna system according to FIG. 6.

FIG. 6 shows another example of an antenna system 305 according to one aspect of the disclosure, and FIG. 7 is a detailed view of the primary radiator with a transmission system of FIG. 6. The antenna system 305 differs substantially from the antenna system 5 of FIG. 1 in that the antenna system 305 comprises a primary transceiver 371 and auxiliary transceiver 373 as part of a fine adjustment system 370 for the fine adjustment of the antenna alignment.

The antenna system 305 comprises a first parabolic antenna 310*a* and a second parabolic antenna 310*b* that have to be aligned with each other. The first parabolic antenna 310a has a first reflector 320a and a first primary radiator 330a. The second parabolic antenna 310b has a second reflector 320b and a second primary radiator 330b. The two primary radiators 330a, 330b are adapted to receive radio signals on a communications link 325 between the first parabolic antenna 310a and the second parabolic antenna 310b and/or to transmit radio signals over the communications link 325.

A first coarse adjustment system 342a and a second coarse adjustment system 342b are provided to align mechanically the first parabolic antenna 310a and the second parabolic antennas 310b. The first coarse adjustment system 342a comprises a first motor drive 340a, which is connected to the first reflector 320a or the first parabolic antenna 310a. The second coarse adjustment system 342b comprises a second motor drive 340b, which is connected to the second reflector 320b or the second parabolic antenna 310b.

A first fine adjustment system 370a is provided for the further finer adjustments of the antennas 310a, 310b, and comprises a commuting system 375a as will be explained later in the disclosure.

The first motor drive 340a and/or the second motor drive 340a, 340b are used for broadly aligning the first reflector 320a or the whole first parabolic antenna 310b with the second reflector 320b or the entire second parabolic antenna 310b.

The first motor drive 340a is adapted to rotate the first reflector 320a or the entire first parabolic antenna 310a around a main axis Xa, in a plane substantially perpendicular to the direction of the communications link 325, as shown by rotational arrow. The first motor drive 340a is further adapted to tilt the first reflector 320a or the entire first parabolic antenna 310a in a plane comprising the direction of the communication links, as shown by rotational arrow 346a. Similarly, the second motor drive 340b is adapted to rotate the second reflector 320b or the entire second parabolic antenna 310b around a main axis Xb, in a plane substantially perpendicular to the direction of the communications link 325, as shown by rotational arrow 345b. The second motor drive 340b is further adapted to tilt the second reflector 320b or the entire second parabolic antenna 310b in a plane comprising the direction of the communication links, as shown by rotational arrow 346b.

The first motor drive 340a is connected to a first control system 360a, and the second motor drive 340b is connected to a second control system 360b. The first control system 360a, or the second control system 360b, is adapted to control the first motor drive 340a, or respectively the second motor drive 340b, and hence the rotation and/or tilting of the first reflector 320a or the entire first parabolic antenna 310a, or the second reflector 320b or the entire second parabolic antenna 310b.

FIG. 7 shows a detailed view of the primary radiator 330a. In this aspect of the disclosure, the primary radiator 330a, 330b comprises at least one array of radiation elements 332a, 332b. The radiation elements 332a are individually and independently controllable and addressable. This means that the phase and amplitude of the radiation elements 332 are either individually addressable, or addressable in subsets of radiation elements 332 by the fine adjustment system 370a.

A primary transceiver 371a comprises a primary power amplifier for transmitting and a primary low noise amplifier for receiving signals to/from the radiation elements of the primary radiator 330a. Therefore the primary transceiver is coupled to a primary feeding network 372a which connects the primary transceiver to the respective antenna elements of the primary radiator 330a.

An auxiliary transceiver 373a comprises an auxiliary power amplifier for transmitting and an auxiliary low noise amplifier for receiving signals to/from the radiation elements of the primary radiator 330a. Therefore the auxiliary transceiver 373a is coupled to a auxiliary feeding network 374a which connects the auxiliary transceiver to the respective antenna elements of the primary radiator 330a.

The auxiliary transceiver 373a and the respective auxiliary feeding network 374a are arranged parallel to the primary transceiver 371a and the respective primary feeding network 372a.

The primary feeding network 372a and the auxiliary feeding network 374a are adapted to form flexible radiation beams by changing the phase and amplitude of the feeding signals or by switching antenna elements on or off.

The auxiliary transceiver 373a is part of said fine adjustment system 370a.

Figure 8:
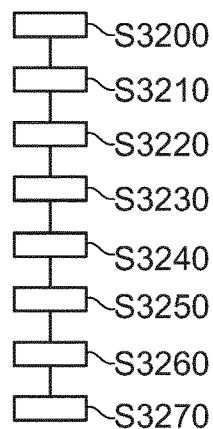
FIG. 8 shows a workflow of a method of alignment an antenna system according to an aspect of the disclosure.

FIG. 8 shows a workflow of a method of alignment, which will now be described, with reference to the antenna system as shown in FIG. 6.

In a first step S3200, the first parabolic antennas 310a and the second parabolic antennas 310b are erected at their locations. The locations are within line of sight of each other and the first reflectors 320a and the second reflectors 320a will be mounted on the mounts connected to the first motor drives 340a and the second motor drives 340a.

An alignment beam will then be emitted and the two control systems 360a and 360b will then start, in step S3210, the rotation and possibly the tilting of at least one of the first reflector 320a and the second reflector 320b in order to align the first reflector 320a and the second reflector 320b with each other.

The coarse adjustment system 342a, 342b may be similar to the coarse adjustment system 42a, 42b of the antenna system 5 or to the coarse adjustment system 242a, 242b of the antenna system 205. The first control system 360a and the second control system 360b can determine a position where the received power is higher, for example using an iterative process until a position at least one of the two reflectors 320a, 320b corresponds to a maximum received power is determined.

Once the two control systems 360a and 360b determine in step S3230 that the both of the reflectors 320a and 320b are substantially aligned with each other such that the directional radio beam on the communications link 325 is well received, the two control systems 360a and 360b can disable their corresponding motor drives 340a and 340b in step S3240.

Suppose now that, after the coarse mechanical alignment, the signals are exchanged and processed via the primary transceiver 371a using the primary radiator 330a.

The fine adjustment system 370a adjusts the phase and amplitude of the primary feeding network 372a of the primary radiator 330a and checks a signal quality from the radiation elements 332a for a plurality of phase and amplitude configurations (step S3250). When the fine adjustment has been done, the communication link is established via the primary transceiver 371a.

After some time, a misalignment of the two antennas 310a and 310b with respect to each other may occur.

It is determined, by the auxiliary transceiver 373a, that other second amplitude and phase parameters of the auxiliary feeding network 374a leads to a better signal quality of signal than the amplitude and phase parameters of the primary feeding network 372a of the primary radiator 330 (step S3260). The determination is done by changing the amplitude and phase parameters of the auxiliary feeding network 374a until better phase and amplitude parameter are found.

The commuting system 375a of the fine adjustment system 370a may therefore decide to commute the functions of the primary transceiver 371a and of the auxiliary transceiver 373a and to switch the communication to the auxiliary transceiver 373a with the auxiliary feeding network 374a having the better phase and amplitude parameters (step S3270).

The commuting of primary transceiver 371a and of the auxiliary transceiver 373a occurs on the fly, whilst the primary transceiver 371a and the auxiliary transceiver 373a are in use, therefore avoiding loosing some signal information. Once the commuting is achieved, the primary transceiver 371a is used for quality of signal investigation, whilst the auxiliary transceiver 373a is used as a main transceiver.

Figure 9:
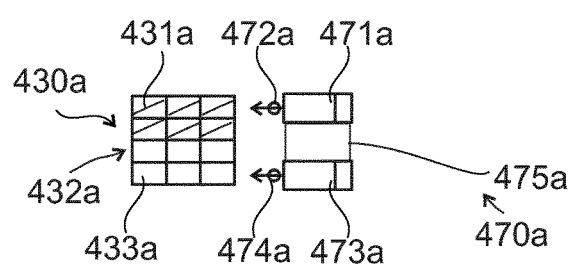
FIG. 9 shows an alternate embodiment of a primary radiator and adjustment system which can be used with an antenna system in an aspect of the disclosure.

FIG. 9 shows another example of primary radiator 430a with a fine adjustment system 470a which can be used with the antenna system of FIG. 6.

The primary radiator 430a comprises a plurality of radiation elements 432a, which are individually and independently controllable and addressable.

A primary transceiver 471a comprises a primary power amplifier for transmitting and a primary low noise amplifier for receiving signals from the radiation elements of the primary radiator 430a. Therefore the primary transceiver is coupled to a primary feeding network 472a which connects the primary transceiver to the respective antenna elements of the primary radiator 430a.

An auxiliary transceiver 473a comprises a auxiliary power amplifier for transmitting and an auxiliary low noise amplifier for receiving signals from the radiation elements of the primary radiator 430a. Therefore the auxiliary transceiver 473a is coupled to a auxiliary feeding network 474a which connects the auxiliary transceiver to the respective antenna elements of the primary radiator 430a.

The auxiliary transceiver 473a and the respective auxiliary feeding network 474a is arranged parallel to the primary transceiver 471a and the respective primary feeding network 472a.

The primary feeding network 472a and the auxiliary feeding network 474a are adapted to form different radiation beams by changing the phase and amplitude of the feeding signals or by switching antenna elements on or off.

The fine adjustment system 470a checks a signal quality transmitted from the auxiliary subset 433a of the radiation elements and the commuting system 475a may commute and switch from the primary subset 431a to the auxiliary subset 433a, depending on the signal quality check.

The steps S3260 and S3270 of the adjustment process described with reference to FIG. 8 may be modified as follows. It is determined that the auxiliary subset 433a of the radiation elements 432a leads to a better signal quality than the primary subset 431a of the radiation elements 432a. The signal quality can be determined using amplitude of the signal.

The commuting system 475a of the fine adjustment system 470a commutes the functions of the primary transceiver 471a and of the auxiliary transceiver 473a. Once the commuting has been carried out, the primary transceiver 471a in conjunction with the primary subset 431a of the radiation elements is used for investigating the quality of the signal, whilst the auxiliary transceiver 473a in conjunction with the auxiliary subset 431a of the radiation elements is used as a primary transceiver. The commuting system 475a may comprise a commuting matrix for the primary subset 431a of the radiation elements and the auxiliary subset 433a of the radiation elements 432a. The commuting may be carried out in the intervals between the transmission and reception intervals in TDD (Time Division Duplexing) process. The commuting may be carried out in less than 100 ns.

In contradistinction to the fine adjustment system 370a of FIG. 7, which was adapted to adjust the phase and amplitude parameters for the radiating elements 332a of the primary radiator 330a, the fine adjustment system 470 of FIG. 9 is adapted to commute from one of the primary subset 431a or the auxiliary subset 433a to the other one of the primary subset 431a or the auxiliary subset 433a which would lead to a better quality of signals, and vice versa.

Figure 10:
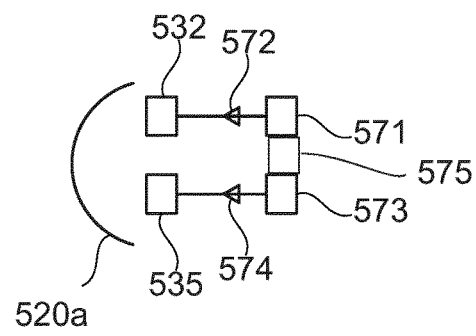
FIG. 10 shows an alternate embodiment of a primary radiator which can be used with an antenna system in an aspect of the disclosure.

FIG. 10 shows yet another example of a primary radiator that can be used with the antenna system of FIG. 6. In this aspect of the disclosure, the primary radiator comprises at least two horn elements 532, 535.

A primary transceiver 571 is coupled to a primary amplifier 572 and is designed to transmit signals to a first horn element 532. An auxiliary transceiver 573 is coupled to an auxiliary amplifier 574 and is designed to transmit signals to a second (auxiliary) horn element 535. The fine adjustment of the horn elements can be done by using an actuator. Alternatively, an antenna array can be used instead of the horn antennas.

Suppose now that, after a coarse mechanical alignment, the signals are exchanged and processed via the first horn element 532. After some time, a misalignment of the antennas 310a, 310b with respect to each other may occur. This may be the case when one or both of the two antennas 310a, 310b have slightly moved, e.g. due to vibrations.

It is determined that the second horn element 535 should be used and lead to a better signal quality of the signal than the first horn element 532.

A commuting system 575 carries out the commuting from the first horn element 532 to the second (auxiliary) horn element 535. The commuting may occur whilst the primary transceiver 571 and the auxiliary transceiver 572 are in use, therefore avoiding losing some signal information during the passage from the first horn element 532 to the second (auxiliary) horn element 535. Once the commuting is achieved, the primary transceiver 571 may be shut down.

As noted above, the fine alignment of the radio beam can be carried out on the fly whilst the radio beam on the communication link 25 is being transmitted.

The invention claimed is:

1. An antenna comprising:
    a reflector connected to a motor drive
    a primary radiator for transceiving a radio beam at an operating frequency impinged on the reflector;
    a coarse alignment system comprising a motor drive connected to the reflector for driving at least one of the rotation and the tilting of the reflector, the coarse alignment system comprising a first auxiliary antenna connected to a control device for communication with a second auxiliary antenna located at a second antenna, the communication being at a second frequency different from the operating frequency;
    a fine alignment system for electronic adjustment of the direction of the radio beam;
    the control device for controlling both the coarse alignment system and the fine alignment system.

2. The antenna of claim 1, wherein the auxiliary antenna is adapted to establish an auxiliary radio beam or radio link with the further auxiliary antenna at a second antenna.

3. The antenna of claim 1, wherein the auxiliary antenna is adapted to exchange control signals using one of a different communication standard from the communication standard used by the radio beam established between the antenna and the second antenna.

4. The antenna of claim 1, wherein the auxiliary antenna is adapted to receive or send information to and from the control device.

5. The antenna of claim 4, wherein the information is related to a level of received power for a position of the reflector.

6. The antenna of claim 1, wherein the control device is adapted to detect side lobes of the operating frequency for controlling the alignment system.

7. The antenna of claim 1, wherein the primary radiator comprises a primary transceiver, and wherein the fine alignment system comprises an auxiliary transceiver and a commuting system for commuting between the primary transceiver and the auxiliary transceiver.

8. The antenna of claim 7, wherein the primary radiator comprises a plurality of radiating elements and wherein the commuting system is adapted to adjust a phase and amplitude parameters for the radiating elements.

9. The antenna of claim 7, wherein the primary radiator comprises a first subset of radiating elements and a second subset of radiating elements, wherein the commuting system is adapted to commute between the first subset of radiating elements and the second subset.

10. An antenna system comprising at least two antennas claim 1, wherein the control devices of the at least two antennas are adapted to exchange control messages concerning alignment of the at least two antennas.

11. A method for aligning a first antenna and a second antenna, the first antenna having a first primary radiator and a first primary reflector, the second antenna having a second primary radiator and a second primary reflector, the method comprising:

causing at least one of the first primary reflector and the second primary reflectors to be at least one of rotated or tilted using a motor drive of a coarse alignment system controlled by a control device and thus establishing a communications link with a second one of the first antenna or the second antenna, wherein an auxiliary communication link is established between a first auxiliary antenna of the first antenna and a second auxiliary antenna of the second antenna; the communication between the first auxiliary antenna and the second auxiliary antenna being at a second frequency different from the operating frequency, and adjusting, by a fine alignment system controlled by the control device, the communications link by electronically changing parameters of the radio beam along the communications link, comprising electronic adjustment of the direction of the radio beam.

12. The method of claim 11, comprising the step of:
using side lobes of an operating frequency between the first primary radiator of the first antenna and the second primary radiator of the second antenna.

13. The method of claim 11, further comprising the step of:
sending a control message from the first one of the two antenna systems to the second one of the two antenna systems during rotation of the reflector indicative of a strength of the communications link.

14. The method of claim 11, further comprising the step of:
disabling the motor drive after establishment of the communications link.

15. The method of claim 11, further comprising the step of using a primary transceiver and an auxiliary transceiver when the communication link is established, for adjusting the communication link, and commuting between the primary transceiver and the auxiliary transceiver.

* * * * *